(12) United States Patent
Inagaki et al.

(10) Patent No.: US 6,849,201 B2
(45) Date of Patent: Feb. 1, 2005

(54) WASTE WATER TREATMENT MATERIAL, WASTE WATER TREATMENT METHOD, SLUDGE DEHYDRATING AGENT AND SLUDGE TREATMENT METHOD

(75) Inventors: Yasuhito Inagaki, Kanagawa (JP); Haruo Watanabe, Kanagawa (JP); Shigeo Kiuchi, Chiba (JP); Takaaki Kano, Kanagawa (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 10/395,677

(22) Filed: Mar. 24, 2003

(65) Prior Publication Data

US 2003/0160002 A1 Aug. 28, 2003

Related U.S. Application Data

(62) Division of application No. 09/367,799, filed as application No. PCT/JP98/05753 on Dec. 18, 1998, now Pat. No. 6,573,336.

(30) Foreign Application Priority Data

Dec. 19, 1997 (JP) ............................................ P9-351719
Jun. 11, 1998 (JP) .......................................... P10-163844

(51) Int. Cl.[7] ................................................ C02F 1/68
(52) U.S. Cl. ...................................... 252/175; 210/749
(58) Field of Search .......................... 210/749; 252/175

(56) References Cited

U.S. PATENT DOCUMENTS

| 3,644,091 A | 2/1972 | Naschke et al. ............... 23/165 |
| 4,692,237 A | 9/1987 | Hsu et al. .................... 208/177 |
| 6,573,336 B1 | 6/2003 | Inagaki et al. ........... 525/333.5 |

FOREIGN PATENT DOCUMENTS

| JP | 58-142985 | 8/1983 |
| JP | 2-2098304 | 12/1990 |
| JP | 10-099867 | 4/1998 |
| JP | 10-101730 | 4/1998 |
| JP | 10-101733 | 4/1998 |

*Primary Examiner*—Bernard Lipman
(74) *Attorney, Agent, or Firm*—Sonnenschein, Nath & Rosenthal LLP

(57) ABSTRACT

Sulfonated styrene polymer and/or its salt, a waste water treatment material and sludge dehydrating agent each containing the sulfonated styrene polymer and/or its salt as an effective component thereof are disclosed. The waste water treatment material is used such that sulfonated styrene polymer and/or its salt, which has viscosity of 10 mPa·S to 20,000 mPa·S at 25° C. after 0.01 N to 5 N neutral salt has been added to 1 wt % water solution of the sulfonated styrene polymer and/or its salt, is added to each waste water so that waste water is purified. When a sludge dehydrating agent is required, sulfonated styrene polymer and/or its salt having a weight average molecular weight of 1,100,000 or greater is combined with a cation polymer flocculating agent or an inorganic flocculating agent.

6 Claims, No Drawings

WASTE WATER TREATMENT MATERIAL, WASTE WATER TREATMENT METHOD, SLUDGE DEHYDRATING AGENT AND SLUDGE TREATMENT METHOD

STATEMENT OF RELATED APPLICATIONS

This application is a divisional of, and claims the benefit of the earlier filing date of, and priority to: U.S. patent application Ser. No. 09/367,799 (filed on 7, Jan. 2000)(now U.S. Pat. No. 6,573,336), which is the national stage entry of International Application PCT/JP98/05753 (filed on 18 Dec. 1998), which itself claims priority to Japanese Patent Applications JP P09-351719 (filed on 19 Dec. 1997) and JP P10-163844 (filed 11 Jun. 1998); the disclosures of which are expressly incorporated by reference herein to the extent permissible by law.

TECHNICAL FIELD

The present invention relates to a waste water treatment material and sludge dehydrating agent containing, as an effective component thereof, sulfonated styrene polymer and its salt, and more particularly to a waste water treatment method and a sludge treatment method using the same.

BACKGROUND ART

Contamination of rivers, underground water and so forth caused from various industrial effluent, sewage sludge, excrement sludge have raised a critical social problem. Therefore, techniques for the waste water treatment have attracted keen interest.

Under the foregoing circumstances, a variety of waste water treatment techniques have been investigated. Flocculating treatment using a polymer flocculating agent is one of the foregoing techniques.

For example, in Japanese Patent Laid-Open No. 58-216707 and Japanese Patent Laid-Open No. 2-298400, a technique has been suggested which uses sodium polystyrene sulfonate to serve as a waste water treatment material. According to the foregoing disclosures, an effect of flocculating the various waste water has been reported.

Available sodium polystyrene sulfonate, however, suffers from an unsatisfactorily small particle size of generated flocs, excessively low settling velocity and filtration velocity and unsatisfactory large water content in the dehydrated sludge (cakes) and turbidity of the filtered solution. From the foregoing viewpoint, the performance of the foregoing sodium polystyrene sulfonate is unsatisfactory.

On the other hand, treatment of sludge, such as sewage sludge, excrement sludge or various industrial waste water, has been performed by adding a flocculating agent (a dehydrating agent) to the sludge to flocculate suspended substances so as to produce flocs. Then, sludge from which the flocs have been obtained is dehydrated by a belt-press dehydrating machine or a filter-press dehydrating machine so as to separate the sludge into a solid component (a cake) and water. The foregoing sludge treatment must realize a low water content in the flocs and cakes produced in the foregoing process, a high filtration velocity required in the process for filtering sludge and a satisfactory separation characteristic between the filter cloth and the cakes.

As the dehydrating agent for use in the foregoing sludge treatment, cation polymer flocculating agent, such as polymer of quaternary salt of dimethylaminoethyl acrylate or dimethylaminoethyl methaacrylate or copolymer of quaternary salt of dimethylaminoethyl acrylate or dimentylamino-ethyl methacrylate and acrylamide is solely employed. As an alternative to this, the cation polymer flocculating agent and an anion polymer flocculating agent are combined with each other.

A variety of polymers have been suggested as the anion polymer flocculating agent. For example, polyacrylic acid has been suggested in Japanese Patent Laid-Open No. 58-216707, while sodium polystyrene sulfonate having an average molecular weight of 1000 to 1,000,000 has been disclosed in Japanese Patent Laid-Open No. 2-298400.

However, sole use of the cation polymer flocculating agent suffers from a high water content of the produced flocs and, therefore, the realized dehydration characteristic is unsatisfactory. If the cation polymer flocculating agent and the anion polymer flocculating agent are combined with each other such that sodium polyacrylate or sodium polystyrene sulfonate having the average molecular weight of 1000 to 1,000,000 is employed as the anion type flocculating agent, there arises a problem of a low filtration velocity of sludge and an unsatisfactory processing efficiency.

DISCLOSURE OF THE INVENTION

An object of the present invention is to provide a novel waste water treatment material and a waste water treatment method with which settling velocity and filtration velocity can be raised and which are able to lower the water content in dehydrated sludge (cakes) and the turbidity of filtered solution.

Another object of the present invention is to provide a sludge dehydrating agent and a sludge treatment method with which the water content in the cakes produced in the process can be lowered, which enables a high filtration efficiency to be realized in a process for filtering sludge and which causes filter cloth and the cakes to easily be separated.

The inventors of the present invention have energetically performed investigations to obtain a waste water treatment material and a waste water treatment method which exhibit excellent settling velocity, filtration velocity, water content in dehydrated sludge, separability of dehydrated cakes and cleanliness (the turbidity) of filtered solution. Thus, the present invention has been achieved.

That is, a waste water treatment material according to the present invention comprises: a sulfonated styrene polymer and/or its salt as an effective component thereof, wherein the sulfonated styrene polymer and/or its salt has a viscosity satisfying a range from 10 mPa·S to 20,000 mPa·S at 25 degrees C after a neutral salt in a quantity which satisfies a range from 0.01 N to 5 N has been added to a 1 wt % water solution of the sulfonated styrene polymer and/or its salt.

A waste water treatment method according to the present invention comprising the steps of adding a waste water treatment material containing sulfonated styrene polymer and/or its salt as an effective component to each of various waste water; and purifying waste water, wherein the sulfonated styrene polymer and/or its salt has viscosity satisfying a range from 10 mPa·S to 20,000 mPa·S at 25° C. after neutral salt in quantity which satisfies a range from 0.01 N to 5 N has been added to 1 wt % water solution of the sulfonated styrene polymer and/or its salt.

The sulfonated styrene polymer and/or its salt having the above-mentioned characteristic exhibits a stable flocculating performance.

On the other hand, a sludge dehydrating agent comprises sulfonated styrene polymer and/or its salt having a weight average molecular weight of 1,100,000 or greater.

A sludge treatment method according to the present invention comprises the step of sequentially adding, to sludge, sulfonated styrene polymer having a weight average molecular weight of 1,100,000 or greater and/or its salt and cation polymer flocculating agent and/or inorganic flocculating agent.

The sulfonated styrene polymer having the weight average molecular weight of 1,100,000 or greater and/or its salt is employed as the sludge dehydrating agent. Moreover, the sludge dehydrating agent and cation polymer flocculating agent and/or inorganic flocculating agent are sequentially added to sludge. Thus, flocs each having a low water content are produced. When sludge from which the flocs have been produced is filtered, the filtering process can be performed at a high filtration velocity. Thus, sludge can be separated into filtrate having a low turbidity and sludge cakes. The thus-produced cakes can easily be separated ftom the filter cloth and have a low water content. As a result, fuel in a small quantity is required to burn the cakes. Thus, sludge treatment can efficiently be performed.

In an embodiment, the waste water treatment material of the present invention comprises a material selected from the group consisting of a sulfonated styrene polymer and a salt of a sulfonated styrene polymer, wherein a 1 wt % aqueous solution of said material has a viscosity ranging from 10 mPa·S to 20,000 mPa·S at 25° C. after a neutral salt has been added to the aqueous solution so that a concentration of the neutral salt in the aqueous solution ranges from 0.01 N to 5 N.

In an embodiment, the viscosity of the aqueous solution ranges from 10 mPa·S to 500 mPa·S at 25° C. after the neutral salt has been added to the aqueous solution so that a concentration of the neutral salt in the aqueous solution is about 0.2 N.

In an embodiment, the viscosity of the aqueous solution ranges from 10 mPa·S to 500 mPa·S at 25° C. after the neutral salt has been added to the aqueous solution so that a concentration of the neutral salt in the aqueous solution is about 1 N.

In an embodiment, the sulfonated styrene polymer and/or its salt is water soluble and has a cross-linked structure.

In an embodiment, the sulfonated styrene polymer and/or its salt is sulfonated waste material.

In an embodiment, the waste water treatment method of the present invention comprises the steps of adding a waste water treatment material to waste water, the material being selected from the group consisting of a sulfonated styrene polymer and a salt of a sulfonated styrene polymer, wherein a 1 wt % aqueous solution of said material has a viscosity ranging from 10 mPa·S to 20,000 mPa·S at 2500 after a neutral salt has been added to the aqueous solution so that a concentration of the neutral salt in the aqueous solution ranges from 0.01 N to 5 N; and purifying the waste water.

In an embodiment, the material further comprises a flocculating agent selected from the group consisting of a nonionic polymer fiocculating agent, an anionic polymer flocculating agent, a cationic polymer flocculating agent, and an inorganic flocculating agent.

In an embodiment, a material is selected from the group consisting of a sulfonated styrene polymer and a salt of a sulfonated styrene polymer, the sulfonated styrene polymer or the salt of the sulfonated styrene polymer having a molecular weight of at least 1,100,000.

In an embodiment, the sulfonated styrene polymer has a molecular weight ranging from 1,100,000 to 10,000,000.

In an embodiment, the sulfonated styrene polymer and/or its salt is prepared by cross-linking the sulfonated styrene polymer and/or its salt using a cross-linking monomer in an amount ranging from about 0.01 mol % to about 10 mol %.

In an embodiment, the sulfonated styrene polymer and/or its salt comprises a styrene polymer that has a pre-sulfonatlon average molecular weight ranging from 4.5 to 20.

In an embodiment, the method of dehydrating sludge comprises the steps of adding to the sludge a material selected from the group consisting of a sulfonated styrene polymer and a salt of a sulfonated styrene polymer, and adding a fiocculating agent to the sludge and material, the flocculating agent being selected from the group consisting of a cationic polymer flocculating agent and an inorganic flocculating agent.

Other objects and advantages of the present invention will become apparent from reading the following detailed description and appended claims, and upon reference to the accompanying drawings.

DETAILED DESCRIPTION OF THE PRESENTLY PREFERRED EMBODIMENTS

Sulfonated styrene polymer and/or its salt which is employed as a waste water treatment material according to the present invention is characterized in that a crosslinking structure is included in each of molecules thereof and a space between the molecules. From the foregoing viewpoint, the sulfonated styrene polymer and/or its salt is different from a conventional polymer flocculating agent for water treatment. That is, the convention polymer flocculating agent for water treatment is usually in the form of a non-crosslinking water soluble polymer electrolyte having a straight chain (one-dimensional) structure which is formed owing to electrostatic repulsion in molecules of ionic substitutional groups represented by carboxylic soda. The water treatment material according to the present invention is water soluble polymer flocculating agent having the (three-dimensional) crosslinking structure in each of molecules thereof and a space between the molecules. Moreover, the water treatment material has sulfonic groups, which are strong electrolytes, to serve as ionic substitutional groups.

Thanks to the foregoing characteristics, the water treatment material according to the present invention is not easily affected by the states of water, which must be subjected to the treatment. For example, influences of the ion concentration, intensity, pH and the components of contained ions (dissolved metal: mainly bivalent or higher metal) can not easily be exerted. Therefore, stable flocculating performance can be obtained as compared with the straight-chain structure.

That is, the conventional polymer flocculating agent encounters restraint of the influence of the electrostatic repulsion in the molecules caused from the ionic substitutional group or ion crosslinks are formed by bivalent metal. The foregoing phenomena take place when the pH of water, which must be subjected to the treatment, is too low, or the intensities of ions are too high or a bivalent or higher metal component is contained. Therefore, contraction (straight chains→thread ball shape) of molecule chains are easily formed. As a result, the conventional water treatment material encounters excessive contraction of the molecule chains owing to the electrolyte components in water, which must be subjected to treatment. Moreover, the viscosity of the water solution of the water treatment material is lowered. As a result, the flocculating performance (the particle size of each of formed flocs) greatly deteriorates. Therefore, when the conventional water treatment material is employed, there arises a problem in that the type of water, which must be subjected to treatment, is limited. Moreover, a great margin (enlargement of the quantity which must be added) to compensate variation in the components in the water, which must be subjected to treatment, is required.

On the other hand, the waste water treatment material according to the present invention having the above-mentioned characteristics has stable flocculating performance free from influences of the type and state of water which must be subjected to treatment.

To distinguish the waste water treatment material according to the present invention from the conventional water treatment material (straight-chain sulfonated styrene polymer and/or its salt), it is preferable that measurement of the viscosity of the water solution using rotary viscometer is performed. In particular, it is preferable that the measurement of the viscosity of the water solution is performed in a system to which an electrolyte, such as neutral salt, is previously added. At this time, the electrolyte component except for the waste water treatment material may be neutral salt, such as sodium chloride, sodium sulfate or sodium nitrate, sodium hydroxide or any one of various buffer solutions. It is preferable that the foregoing neutral salt is employed. It is preferable that the quantity of the foregoing electrolyte which is added to the water solution of the treatment material is 0.01 N to 5 N, more preferably 0.1 N to 1.2 N. If the quantity of the added electrolyte is smaller than the foregoing value, a great error (dispersion of the spread of the molecule chains) occurs when the measurement is performed. If the quantity is larger than the foregoing value, the electrolyte cannot easily be dissolved in the water solution of the waste water treatment material. The concentration of the water solution of the waste water treatment material is 0.1 wt % to 5 wt %, preferably 0.3 wt % to 3 wt %.

If the concentration of the water solution of the waste water treatment material is lower than the above-mentioned value, the viscosity is lowered excessively to perform the measurement using the rotating viscometer. If the concentration is higher than the foregoing value, the waste water treatment material cannot easily be dissolved in water. As a result, the water solution becomes too nonuniform to easily measure the viscosity. Although the temperature at which the measurement is performed is not limited, it is preferable that the temperature is 0° C. to 80° C. The rotating viscometer is exemplified by a B-type viscometer and a vismetron.

When the foregoing method of measuring the viscosity of water solution, the difference between the waste water treatment material according to the present invention and the conventional water treatment material can be distinguished. That is, the waste water treatment material according to the present invention is free from considerable variation of the spread of the molecule chains which occurs owing to change in the concentration in the water solution of the electrolyte. Therefore, a high viscosity of the water solution can be realized as compared with the general straight-chain sulfonated styrene polymer and/or its salt.

The inventors of the present invention has manufactured the sulfonated styrene polymer and/or its salt having the crosslinking structure to evaluate its flocculating performance with respect to a variety of waste water samples. As a result, excellent flocculating performance has been realized when the viscosity satisfies a range from 10 mPa·S to 20,000 mPa·S (25° C.) in a state where neutral salt is added in a quantity of 0.01 N to 5 N to 1% water solution of the treatment material. Specifically, the range of the viscosity of the 1% water solution is 10 mPa·S to 500 mPa·S (25° C.) when the neutral salt is added in a quantity of 0.2 N or the range of the viscosity of the 1% water solution is 10 mPa·S to 200 mPa·S (25° C.) when the neutral salt is added in a quantity of 1 N.

As a result of the measurement of the viscosity, knowledge was obtained about the spread of the molecule chains of the polymer electrolyte (that is, the water treatment material) in the water solution of the electrolyte. Therefore, the conventional water treatment material and the water treatment material according to the present invention can be distinguished from each other.

The sulfonated styrene polymer and/or its salt according to the present invention includes sulfonated styrene copolymer of styrene and monomer which is able to copolymerized with styrene and/or its salt as well as the sulfonated styrene homopolymer and/or its salt.

The monomer which is able to copolymerize with styrene is exemplified by aromatic monomer, such as α-methylstyrene, vinyltoluene or vinylnaphthalene; conjugate diene, such as butadiene, isoprene, pentadiene or cyclopentadiene; olefin, such as ethylene, propylene, butene or isobutylene; acrylic acid, acrylic ester; methacrylic acid; methacrylate; maleic acid; fumaric acid; crotonic acid; itaconic acid; citraconic acid; their ester; monomer containing a nitrile group, such as acrylonitrile; and vinyl-type monomer, such as N-vinylpyrolidone. Each monomer may be employed solely or their combination is permitted.

When the other monomer above is also employed, the content of the monomer is 50 mol % or lower, preferably 2 mol % to 40 mol %.

The styrene polymer may be used styrene polymer or an alloy with another polymer. The styrene polymer may contain various additives, such as pigment and dye, a stabilizer, a frame retardant, a plasticizer, a filler and another adjuvant. That is, the styrene-type polymer may be waste (scraps) discharged from plants, shops, homes and so forth. From a viewpoint of effectively using the global enviromnent resources, the waste is employed as the raw material of the present invention. Note that the styrene-type polymer may be a mixture of used waste and a new product (a virgin material).

The polymer which can be mixed with the styrene-type polymer is exemplified by at least one of materials selected from a group consisting of polyacrylonitrile, polyphenylene ether, polycarbonate, polyphenylene sulfide, polyethylene terephthalate, polybutylene terephthalate, nylon, polyethylene, polypropylene, polyvinyl chloride (PVC) and polybutadiene. It is preferable that the mixture ratio of the foregoing polymer is 60 wt % or lower. If the content is greater than the foregoing value, introduction of the following sulfonic group is inhibited.

It is preferable that the content of the sulfonic group in the sulfonated styrene polymer and/or its salt is 30 mol % or larger with respect to the aromatic core. If the content of the sulfonic group is lower than the above-mentioned value, water solubility cannot be realized. In this case, the flocculating effect excessively deteriorates.

When the styrene-type polymer is employed to serve as the raw material for the sulfonated styrene polymer, the weight average molecular weight of the foregoing polymer which is the raw material is 100 to 1,000,000, preferable 50,000 to 500,000. If the molecular weight of the raw material is greater than the foregoing value, polymer of a type having excessively large molecular weight is undesirably produced after the crosslinking process. As a result, the solubility of sulfonated material with respect to water deteriorates. If the molecular weight of the raw material is smaller than the foregoing value, an effective three-dimensional structure cannot be formed even after the crosslinking process has been performed. As a result, the performance which is required for the polymer flocculating agent cannot be obtained.

As described above, the sulfonated material must have the three-dimensional crosslinking structure to improve the flocculating effect of the sulfonated styrene polymer according to the present invention.

The sulfonated styrene polymer can be obtained by any one of the following methods:

(1) When the styrene-type polymer is sulfonated, sulfon crosslinks are positively formed.

(2) When the styrene-type polymer is manufactured, crosslinking monomer, such as divinylbenzene, is added to obtain crosslinking styrene-type polymer which is then sulfonated.

A specific method of obtaining sulfonated styrene polymer having the three-dimensional structure by the above-mentioned method (1) will now be described. The styrene-type polymer is previously manufactured by a polymerizing reaction. Then, the polymer is dissolved in solvent such that the concentration of the polymer is 0.1 wt % to 40 wt %. Then, a sulfonating agent, such as sulfuric anhydride, sulfuric anhydride/Lewis acid base complex or fuming sulfuric acid, is employed to sulfonate the polymer.

When the sulfonating process is performed by using the sulfiric anhydride, the degree of crosslinking can be effectively controlled by a sulfonating method with which Lewis base serving as a crosslinking control agent is added by 0.1 wt % to 10 wt % of sulfuric anhydride.

When the sulfonating process is performed by using the sulfuric anhydride/Lewis base complex or fuming sulfuric acid, the degree of crosslinking is controlled by adjusting the concentration of the polymer solution, which is the raw material, during the sulfonating process.

When the method (2) is employed, it is preferable that the quantity of the crosslinking monomer which must be added is 0.001 mol % to 3 mol %. If the quantity is lower than 0.001 mol %, the degree of crosslinking of the obtained polymer is unsatisfactorily low to obtain satisfactory flocculating effect. If the quantity is higher than 3 mol %, the polymer which has been sulfonated becomes insoluble with respect to water. In this case, a satisfactory flocculating effect cannot be obtained.

A specific method of obtaining the sulfonated styrene polymer having the three-dimensional structure will now be described. When the styrene-type monomer is polymerized, crosslinking monomer, such as divinylbenzene, is added by 0.001 mol % to 3 mol % to perform radical polymerization, cation polymerization or anion polymerization so that crosslinking styrene-type polymer is obtained. Then, the crosslinking styrene-type polymer is sulfonated by a known method.

The sulfonated styrene polymer may be homopolymer of any one of various salt materials of styrene sulfonate. As an alternative to this, the sulfonated styrene polymer may be a copolymer of a monomer which can be copolymerized with the foregoing homopolymer. The monomer which can be copolymerized with the styrene sulfonate is exemplified by acrylamide, methacrylamide, acrylic acid and/or its salt, vinyl sulfonate, acryl sulfonate, methacryl sulfonate, 2-acrylamide-2-phneylpropane sulfonate, 2-acrylamide-2-methylpropane sulfonate, and (metha) acrylamide. The foregoing monomer which can be copolymerized may be employed solely or two or more types of the monomers may be employed.

When the other monomer is simultaneously employed, the content of the other monomer is 50 mol % or lower, preferably 2 mol % to 40 mol %.

When the foregoing monomer is polymerized, it is effective to add the crosslinking monomer by 0.001 mol % to 3 mol %.

The crosslinking monomer is exemplified by methylene bis (metha) acrylamide, hexamethylene bis (metha) acrylamide, ethylene glycol di (metha) acrylate, polyethylene diglycol di (metha) acrylate, divinyl adipate, divinyl benzene, aryl (metha) acrylate, N,N-diarylacrylamide and trimethylol propane tri (metha) acrylate.

The viscosity of the 1% water solution of the sulfonated styrene polymer is 10 mPa·S to 20,000 mPa·S at 25° C. in a state in which neutral salt is added in a quantity of 0.01 N to 5 N. Specifically, the viscosity of the 1 wt % water solution in a state in which neutral salt is added in a quantity of 0.2 N is 10 mPa·S to 500 mPa·S (25° C.) or the viscosity of the 1 wt % water solution in a state in which neutral salt is added in a quantity of 1 N is 10 mPa·S to 200 mPa·S (25° C.). If the viscosity of the water solution is lower than the foregoing value, the flocculating effect deteriorates. The variety of characteristics including the particle size of flocs, the settling velocity, the filtration velocity, water content in the dehydrated cakes, the cleanliness (turbidity) of the filtrate carmot be improved. If the viscosity of the water solution is higher than the foregoing value, solubility with respect to water deteriorates. Thus, the actual handling of the medicament encounters a difficulty.

The salt of the sulfonated styrene polymer is exemplified by alkali metal salt, alkaline earth metal salt, ammonia salt, amine salt and quaternary ammonia salt.

Alkali metal ions for constituting the alkali metal salt are exemplified by ions of lithium, sodium and potassium.

The alkali earth metal ions for constituting alkali earth metal salt are exemplified by magnesium ions and calcium ions.

The amine for constituting the amine salt is exemplified by alkylamine, such as trimethylamine, triethylamine, tributylamine, diethylamine, dibutylamine or butylamine; arylamine, such as aniline or benzilamine; and alkanolamine, such as triethanolamine, diethanolamine, monoethanolamine or monoethanol dimethylamine.

Quaternary ammonium compounds of the quaternary ammonium salt are exemplified by hydroxytetraalkyl (aryl) ammonium, such as hydroxytetraethyl ammonium, hydroxytrimethylethyl ammonium, hydroxytetramethyl ammonium or hydroxytrimethylbenzil ammonium.

Among the foregoing salts, a preferred salt is the alkali metal salt. In particular, it is preferable that sodium salt is employed. Two or more salts above may be employed simultaneously.

When the above-mentioned sulfonated styrene polymer and/or its salt according to the present invention is employed together with a nonion and/or anion polymer flocculating agent, a cation polymer flocculating agent or an inorganic flocculating agent, the flocculating effect can furthermore be improved.

The nonion and/or anion polymer flocculating agent which can be employed simultaneously is exemplified by the following materials:

(a) polymer of acrylamide and/or methacrylamide and its copolymer;

(b) partial hydrolysate of polyacrylic amide or polymethacrylamide;

(c) copolymer of acrylic acid or methacrylic acid and acrylamide or methacrylamide and its salt;

(d) ternary copolymer or its salt of acrylic acid or methacrylic acid, acrylamide or methacrylamide and 2-acrylamide-methylpropane sulfonate or styrene sulfonate or vinyl sulfonate or vinylmethyl sulfonate;

(e) soda salt of alginic acid, guagum, carboxymethyl cellulose or starch;

(f) straight chain polystyrene acid and its salt; and (g) hydrolysate of polyacrylonitrile.

Among the foregoing materials, it is preferable that the partial hydrolysate of polyacrylamide or polymethacrylamide or a copolymer of acrylic acid or methacrylic acid and acrylamide or methacrylamide and its salt is employed.

The foregoing nonion and/or anion polymer flocculating agent may solely be employed together with the sulfonated styrene polymer and/or its salt and/or their combination may be employed. When the combination is employed, a mixture process may be performed or the materials may sequentially be added.

The cation polymer flocculating agent is exemplified by the following materials:

(a) quaternary material of dialkylaminoalkyl (metha) acrylate (the quaternary material is methyl chloride, dimethyl sulfate or benzil chloride) or salt of an acid (the salt of an acid is exemplified by salt of inorganic acid, such as hydrochloride or sulfate, and salt of organic acid, such as acetate or polymer or copolymer of the foregoing salt of the acid and (metha) acrylamide (for example, a quaternary material of methylchloride of dimethylaminoethylacrylate or polymer or copolymer of the foregoing material and acrylamide);

(b) quaternary material of dialkylaminoalkyl (metha) acrylate or salt of an acid or polymer or copolymer of the foregoing salt of the acid and (metha) acrylamide (for example, a quaternary material of methylchloride of dimethylaminopropylacrylamide and acrylamide);

(c) denatured cation of polyacrylamide (for example, Mannich-denatured or Hoffinan-decomposed polyacrylamide);

(d) epihalohydrin-amine condensate (for example, polycondensate of epihalohydrin and C2-6 alkylenediamine);

(e) polyvinylimidazoline, its quaternary material or salt of acid;

(f) polydimethyldiallylammonium chloride;

(g) dicyandiamide condensate (for example, formalin condensate of dicyandiamide and ammonium chloride);

(h) polyethylene imine, its quaternary material or salt of acid;

(i) polyvinyl imidazole, its quaternary material or salt of acid;

(j) poly 4-vinylbenzil trimethyl ammonium chloride;

(k) chitosan and its salt;

(l) acidic hydrolysate of N-vinylformamide/acrylonitril copolymer, its quaternary material or salt of acid;

(m) polyvinylpyridine, its quaternary material or salt of acid;

(n) water-soluble aniline resin, its quaternary material or salt of acid;

(o) condensate of alkylenedichloride and polyalkylenepolyamine;

(p) polycomposite salt of aniline-formaldehyde;

(q) polyhexamethylene thiourea acetate;

(r) polyamino acid (for example, polylysine, polyglutamic acid and its salt).

Among the foregoing materials, it is preferable that any one of the following materials is employed: polymer of quaternary material of diallylaminoalkyl (metha) acrylate or salt of acid, or copolymer of the foregoing material and (metha) acrylamide, polymer of quaternary material of dialkylaminoalkyl (metha) acrylamide, its salt of acid or copolymer of the foregoing material and (metha) acrylamide. In particular, it is preferable that polymer of quaternary material of dialkylaminoalkyl (metha) acrylate, its salt of acid or copolymer of the foregoing material and (metha) acrylamide is employed.

The foregoing cation polymer flocculating agents may be solely combined with the sulfonated styrene polymer and/or its salt or combination of the cation polymer flocculating agents may be permitted. The waste water treatment material according to the present invention is an anion flocculating agent usually having a negative charge. Therefore, there is apprehension that agglutination and settling occur if the mixture is performed. Therefore, it is preferable that a sequential adding process is employed. When the sequentially addition is performed, the cation polymer flocculating agent is first added, followed by adding the sulfonated styrene polymer and/or its salt. Note that the addition may be performed in reverse order. When treatment of sewage is performed, the former process is usually employed.

The inorganic flocculating agent is exemplified by aluminum sulfate, polyclorinated aluminum, sodium aluminate, ferrous sulfate, ferric chloride, ferric sulfate, copper chloride, denatured basic aluminum sulfate (LACS) and active silica.

The inorganic flocculating agents may solely be combined with the sulfonated styrene polymer and/or its salt or their combination may be combined with the same.

Also the charge of the inorganic flocculating agent is usually opposite to that of the water treatment material. Therefore, there is apprehension that agglutination and settling occur if the two or more inorganic flocculating agents are mixed. Therefore, it is preferable that the materials are sequentially added. When the sequential adding process is employed, the inorganic flocculating agent is usually added first.

In the present invention, at least any one of the nonion and/or anion polymer flocculating agent, the cation polymer flocculating agent and inorganic flocculating agent is employed together with the sulfonated styrene polymer and/or its salt. Thus, the effect of flocculating water which must be treated (the settling velocity, filtration velocity, water content in dehydrated sludge, separation easiness of the dehydrated cakes and cleanliness of filtrate: turbidity) can be improved.

The quantity of the foregoing medicament which must be added varies depending on the type of the waste water, the concentration of suspended substances in the waste water and the treatment facilities and apparatuses. The quantity is about 0.01 ppm to about 1000 ppm (with respect to waste water), preferably 0.1 ppm to 500 ppm (with respect to waste water). If the quantity is too small, a satisfactory flocculating effect cannot be obtained. If the quantity is too large, there arises a disadvantage from viewpoint of cost reduction.

Each water treatment material (the flocculating agent) may be added to waste water by direct addition or by adding in a state of solution or mixed and dispersed state.

When the waste water treatment is performed, addition of the following sub-materials for the process is permitted: (organic) setting agent, chelate resin, a chelate agent, active carbon, ozone water, ion exchange resin, an ion exchange membrane, water absorption resin, hydrogen peroxide water, chlorine, liquefied chlorine, hypochlorous acid, chlorine dioxide, bleaching material, chlorinated isocyanurate, diatomaceous earth or photocatalyst such as titanium oxide and a biological treatment.

Waste water which must be treated in the present invention may be inorganic waste water discharged from a plant or sewage (sewage, excrement and various organic sanitary sewage) from ordinary households.

The filtration and dehydration which are performed by the waste water treatment material according to the present invention are carried out as follows: the waste water treatment material is added to waste water so as to be stirred and mixed so that floes are formed which are then filtered and dehydrated. A dehydrator is employed in the foregoing process, the dehydrator being permitted to be a known dehydrator, such as a belt-press dehydrator, a filter-press dehydrator, a centrifugal dehydrator or a screw press. The dehydrated cakes are burnt or buried by known methods. Moreover, the cakes can significantly easily be formed into fuel or compost.

The waste water treatment material according to the present invention has the three-dimensional crosslinking structure formed therein. Therefore, strong acid radicals (sulfonic acid and/or its salt) can be localized at a considerably high density in the molecules. A satisfactory result, significantly large electrostatic suction force can be generated. As a result, influence of the type of waste water and change in the components in the waste water cannot easily be exerted. Moreover, dense floes can be formed. Therefore, the strength of the floe can be improved and excellent characteristics can be obtained which include settling velocity, filtration velocity and water content in the dehydrated cakes.

The sludge dehydrating agent contains sulfonated styrene polymer having a weight average molecular weight of 1,100,000 or great and/or its salt. The sulfonated styrene polymer and/or its salt acts as a so-called anion polymer flocculating agent which is directly added to sludge or added after a polymer flocculating agent and/or inorganic flocculating agent has been added to sludge.

The sulfonated styrene polymer and/or its salt may be sulfonated styrene homopolymer and/or its salt or sulfonated copolymer of styrene and monomer which can be copolymerized with styrene and/or its salt.

The monomer which can be copolymerized with styrene is exemplified by aromatic monomer, such as α-methylstyrene, vinyltoluene or vinylnaphthalene; conjugate diene, such as butadiene, isoprene, pentadiene or cyclopentadiene; olefin, such as ethylene, propylene, butene or isobutylene; acrylic acid; methacrylic acid; maleic acid; fumaric acid; crotonic acid; itaconic acid; their esters; and monomer containing a nitrile group, such as acrylonitrile. Each of the foregoing monomers may be employed solely so as to be copolymerized with styrene or their combination may be copolymerized with styrene. It is preferable that the content of the other monomer is 50 mol % or lower, more preferably 2 mol % to 40 mol %.

It is preferable that the sulfonated styrene polymer and/or its salt has the three-dimensional structure, such as the crosslinking structure, to improve the flocculating effect.

The sulfonated styrene polymer and/or its salt having the crosslinking structure can be prepared by a method (a) sulfon crosslinking is positively formed when the styrene-type polymer is sulfonated; or (b) crosslinking monomer, such as divinyl benzene, is added when the polymerizing reaction is performed to obtain the styrene-type polymer so as to prepare crosslinking styrene-type polymer which is then sulfonated.

When the method (a) is employed, the following conditions are employed in which styrene-type polymer is dissolved in solvent at a concentration of 0.2 wt % to 40 wt % so as to be sulfonated by a sulfonating agent, such as sulfuric anhydride.

The styrene-type polymer may be a material (a virgin product) newly prepared to manufacture the sludge dehydrating agent or waste (scraps) discharged from plants, shops or households. The virgin product and the scraps may simultaneously be employed. From a viewpoint of conservation of global environment, it is preferable that scraps are positively employed in place of the virgin product.

When the scraps are employed, the styrene-type polymer may be an alloy with another polymer. The scraps may contain various additives, such as pigment and dye, a stabilizer, a frame retardant, a plasticizer, a filler and another adjuvant.

Another polymer may be mixed with the styrene-type polymer. The polymer which can be mixed as described above is exemplified by polyacrylonitrile, polyphenylene ether, polycarbonate, polyphenylene sulfide, polyethylene terephthalate, polybutylene terephthalate, polyamide, polyethylene, polypropylene, PVC (polyvinyl chloride) and polybutadiene. It is preferable that the quantity of the other polymer which must be mixed is 60 wt % or lower. If the quantity of the other polymer which must be mixed is higher than 60 wt %, introduction of the sulfonic group is inhibited.

When the sulfonated styrene polymer and/or its salt which can be obtained by the method (a) is employed, the ratio (Mw–S)/(Mw–P) of the weight average molecular weight (Mw–S) of the sulfonated styrene polymer and weight average molecular weight (Mw–P) of the styrene-type polymer which is not subjected to the sulfonating process is the index of the degree of crosslinking. The number of sulfon crosslinks increases in proportion to the foregoing ratio.

It is preferable that the value of (Mw–S)/(Mw–P) of the sulfonated styrene polymer and/or its salt for use as the sludge dehydrating agent is 4.5 to 20.0. If the value of (Mw–S)/(Mw–P) is smaller than 4.5, the spread of molecules is unsatisfactory to obtain a satisfactory flocculating effect. If the value of (Mw–S)/(Mw–P) is larger than 20.0, dissolution with respect to water is lowered to obtain a satisfactory flocculating effect.

Specifically, the method (b) is performed such that crosslinking monomer, such as divinyl benzene, is added when styrene-type monomers are polymerized or the styrene-type monomer and another monomer are copolymerized to perform radical polymerization, cation polymerization or anion polymerization. Thus, crosslinking styrene-type polymer is prepared which is then sulfonated by a known method.

It is preferable that the quantity of the crosslinking monomer which must be added is 0.01 mol % to 10 mol % with respect to the styrene-type monomer. If the quantity of the crosslinking monomer which must be added is smaller than 0.01 mol %, the degree of crosslinking becomes unsatisfactory to obtain a satisfactory flocculating effect. If the quantity of the crosslinking monomer which must be added is larger than 10 mol %, the sulfonated polymer and/or its salt is insoluble with respect to water. In this case, a satisfactory flocculating effect cannot be realized.

Salt of the sulfonated styrene polymer may be salt of a type obtained by neutralizing the thus-prepared sulfonated styrene polymer with alkali. The salt may be homopolymer of styrene sulfonate or copolymer of styrene sulfonate and monomer which can be copolymerized with the styrene sulfonate.

The monomer which can be copolymerized with styrene sulfonate is exemplified by acrylic acid, its salt, vinyl sulfonate, acrylic sulfonate, methallyl sulfonate, 2-acrylamide-2-phenylpropane sulfonate, 2-acrylamide-2-methylpropane sulfonate and (metha) acrylamide. One of the foregoing monomers may be employed so as to be copolymerized with styrene sulfonate or two or more types of the monomers may be copolymerized with the styrene sulfonate. It is preferable that the content of the other monomer is 50 mol % or lower, more preferably 2 mol % to 40 mol %.

It is preferable that also the copolymer of the styrene sulfonate and the foregoing monomer has the three-dimensional structure, such as the crosslinking structure, in order to improve the flocculating effect.

To form the crosslinking structure, crosslinking monomer is added in a quantity of 0.01 mol % to 10 mol % when the styrene sulfonate and the foregoing monomer are polymerized with each other.

The crosslinking monomer is exemplified by methylene bisacrylamide, methylene bismetha acrylamide, hexamethylene bisacrylamide, hexamethylene bismethaacrylamide, ethylene glycol diacrylate, ethyleneglycol dimethaacrylate, polyethylene glycol diacrylate, polyethylene glycol dimethaacrylate, divinyl adipate, acrylacrylate, arylmethaacrylate, N,N-diarylacrylamide, trimethylolpropane triacrylate and trimethylolpropane trimethaacrylate.

The type of the salt of the sulfonated styrene polymer is exemplified by alkali metal salt, alkaline earth metal salt, ammonia salt, amine salt and quaternary ammonia salt.

Alkali metal ions for constituting the alkali metal salt are exemplified by ions of lithium, sodium and potassium.

The amine for constituting the amine salt is exemplified by alkylamine, such as trimethylamine, triethylamine, dibutylamine, diethylamine, dibutylamine or butylamine; arylamine, such as aniline or benzilamine; and alkanolamine, such as monoethanolamine or monoethanoldimethylamine.

Quaternary ammonium compounds of the quaternary ammonium salt are exemplified by hydroxytetraalkyl (aryl) ammonium, such as hydroxytetraethyl ammonium, hydroxytrimethylethyl ammonium, hydroxytetramethyl ammonium or hydroxytrimethylbenzil ammonium.

Among the foregoing salts, a preferred salt is the alkali metal salt. In particular, it is preferable that sodium salt is employed. The salt of the sulfonated styrene polymer may contain any one of the types of the foregoing ions or two or more types of the foregoing ions.

It is preferable that the sulfonated styrene polymer and/or its salt contains sulfonate in a quantity of 30 mol % or greater with respect to aromatic cores. If the content of the sulfonate is smaller than the above-mentioned value, water solubility cannot be realized. In this case, the dehydrating effect excessively deteriorates.

It is preferable that the weight average molecular weight of the sulfonated styrene polymer and/or its salt is 1,100,000 to 10,000,000, more preferably 1,200,000 to 10,000,000. If the weight average molecular weight is smaller than 1,100,000, the electrostatic suction force with respect to positive ions in the sludge is reduced. Therefore, required dehydrating performance cannot be obtained which includes water content in the flocs, the filtration velocity when the sludge is dehydrated, the separation easiness of the dehydrated cakes and cleanliness (the turbidity) of the filtrate. If the weight average molecular weight is larger than 10,000,000, handling easiness of the sludge dehydrating agent deteriorates.

The foregoing sulfonated styrene polymer and/or its salt is combined with cation polymer flocculating agent and/or inorganic flocculating agent.

The cation polymer flocculating agent and the inorganic flocculating agent may be those exemplified in the description about the waste water treatment material.

The cation polymer flocculating agent and the inorganic flocculating agent may be employed solely or two or more types of the cation polymer flocculating agents may be combined or two or more types of the inorganic flocculating agents may be combined. Both of the cation polymer flocculating agent and the inorganic flocculating agent may be employed.

To treat sludge by combining the sulfonated styrene polymer and/or its salt, the cation polymer flocculating agent and the inorganic flocculating agent, the foregoing compounds are first added to the sludge to flocculate suspended substances in the sludge so as to produce flocs.

The sludge which must be treated is sludge of a type having a minus zeta potential and charged to a negative charge. The main portion of the sludge is organic sludge. Inorganic substances may be mixed with the sludge. For example, sewage, excrement, excess sludge produced from active sludge treatment of various sanitary sewage, sludge in a preliminary sedimentation basin for sewage, sludge in an excrement purifier tank, aerobic or anaerobic digestion sludge, waste water from paper pulp industry, waste water containing oil, flocculating setting sludge, such as waste water by dyeing and flocculated sludge produced in a tertiary process of sewage or excrement. The foregoing sludge is treated solely or after mixing.

When the sulfonated styrene polymer and/or its salt, cation polymer flocculating agent and the inorganic flocculating agent are added to the foregoing sludge, it is preferable that the foregoing materials are sequentially added.

The addition is performed by a method with which the sulfonated styrene polymer and/or its salt is added and stirred so as to be flocculated. Then, the cation polymer flocculating agent or the inorganic flocculating agent is added and stirred so as to be flocculated. Another method may be employed with which the cation polymer flocculating agent or the inorganic flocculating agent is added and stirred so as to be flocculated. Then, the sulfonated styrene polymer and/or its salt is added and stirred so as to be flocculated. The latter method is a usual method.

The method of adding the foregoing compounds to the sludge may be performed such that the compounds are directly added to the sludge. As an alternative to this, the compounds are dissolved or mixed and dispersed in water, and then the compounds are added to the sludge.

The quantity of each of the compounds which must be added is determined depending on the type of the sludge, the concentration of the suspended substances and the dehydrating facilities. It is preferable that the quantity is 0.01 ppm to 1000 ppm (with respect to waste water), preferably 0.1 ppm to 500 ppm (with respect to waste water). If the quantity is too small, satisfactory dehydrating effect cannot be obtained. If the quantity is larger than the above-mentioned range, the flocculation effect cannot furthermore be improved. In this case, the cation compounds come to naught. Usually, the cation flocculating agent is added in the same quantity as that of the sulfonated styrene polymer and/or its salt or in a quantity of one hundred times or greater.

When sludge is flocculated, addition of the following sub-materials for the process is permitted: nonion or anion polymer flocculating agent, a setting agent, chelate resin, a chelate agent, active carbon, ozone water, ion exchange resin, an ion exchange membrane, water absorption resin, hydrogen peroxide water, chlorine, liquefied chlorine, hypochlorous acid, chlorine dioxide, bleaching material, chlorinated isocyanurate, diatomaceous earth or photocatalyst such as titanium oxide and a biological treatment material.

The compounds are added as described above to flocculate suspended substances, and then the flocculated materials are dehydrated. The dehydrator may be any one of the following conventional dehydrators, which are a belt-press dehydrator, a filter-press dehydrator, a centrifugal dehydrator or a screw press. According to the present invention, the water content in the cakes formed by the belt-press dehydrator can be lowered. Thus, the separability between the cake and filtration cloth can be improved.

The cakes dehydrated by the dehydrator are burnt or buried by known methods. Moreover, the cakes can significantly easily be formed into fuel or compost.

Then, results of experiments will be used to describe the present invention further in detail.

EXAMPLE OF APPLICATION TO WASTE WATER TREATMENT

Preparation Example 1

Manufacturing of Sulfonated Styrene Polymer and/or Its Salt

Commercial GP-grade polystyrene (Mw: 200,000) in a quantity of 100 parts by weight were dissolved in 2000 parts by weight of chloroform, and then three parts by weight of acetic acid were added so that raw material solution was obtained. The raw material solution was, together with sulfuric anhydride ($SO_3$) which was a sulfonating material, continuously supplied to a sulfonating reactor having a turbine stirrer so that sulfonating reactions were performed at 45° C. In the foregoing case, supply rates were as follows: the raw material solution was supplied at 80 g/minute and sulfuric anhydride was supplied at 3.38 g/minute. The molar ratio of styrene units in $SO_3$/polystyrene was 1.10. The reactor having a jacket and a capacity of 400 ml was employed. Then, chloroform was, by distillation, removed from the mixture obtained from the foregoing reactions so that sulfonated polystyrene was obtained. The obtained sulfonated polystyrene was neutralized with sodium hydroxide solution so that Na polystyrene sulfonate was obtained.

The viscosity of 1 wt % water solution of the obtained Na polystyrene sulfonate (called treatment material A) at 25° C. was 18 mPa·S (added with 1N sodium nitrate). The introduction ratio of sulfonic groups was 100 mol %.

Preparation Example 2

Manufacturing of Sulfonated Plastic Waste and/or Its Salt

Used styrofoam waste (polystyrene having Mw: 210,000) in a quantity of 60 parts by weight was dissolved in 2000 parts by weight of 1,2-dichloroethane. Then, 0.6 part by weight of acetophenone serving as a crosslinking controller was added so that raw material solution was obtained. The raw material solution was, together with sulfuric anhydride ($SO_3$) which was a sulfonating material, continuously supplied to a sulfonating reactor having a turbine stirrer so that sulfonating reactions were performed at 45° C. In the foregoing case, supply rates were as follows: the raw material solution was supplied at 80 g/minute and sulfuric anhydride was supplied at 2.12 g/minute. The molar ratio of styrene skeleton in $SO_3$/polystyrene was 1.15. The reactor having a jacket and a capacity of 400 ml was employed. Then, 1,2-dichloroethane was, by distillation, removed from the mixture obtained from the foregoing reactions so that sulfonated styrofoam was obtained. The obtained sulfonated styrofoam was neutralized with sodium hydroxide solution so that Na sulfonate was obtained.

The viscosity of 1 wt % water solution of the obtained Na sulfonate (called treatment material B) at 25° C. was 230 mPa·S after 0.2 N sodium nitrate was added. After 1.0 N sodium nitrate was added, the viscosity was 102 mPa·S. The introduction ratio of sulfonic groups was 100 mol %.

Preparation Example 3

Manufacturing of Sulfonated Plastic Waste and/or Its Salt

Housing waste of a television set (high-impact polystyrene having Mw of 180,000 and containing 5 mol % of polybutadiene) was employed and 5 parts by weight of PEG200 were employed as the crosslinking controller. A similar process to that preparation example 2 was performed except for the foregoing difference so that a sulfonating process and a neutralizing process were performed. Thus, Na sulfonate of the foregoing waste was obtained.

The viscosity of 1 wt % water solution of the obtained Na sulfonate (called treatment material C) at 25° C. was 54 mPa·S (after 1N sodium nitrate was added). The introduction ratio of sulfonic groups was 90 mol %.

Preparation Example 4

Manufacturing of Sulfonated Plastic Waste and/or Its Salt

Used styrofoam waste (polystyrene having Mw of 210,000) in a quantity of 100 parts by weight was dissolved in 900 parts by weight of 1,2-dichloroethane so that raw material polymer solution was prepared. While solution obtained by adding 256 parts by weight of triethyl phosphate to 1500 parts by weight of 1,2-dichloroethane was being stirred in a state in which the solution was cooled with ice, 154 parts by weight of sulfuric anhydride were dropped. Thus, sulfuric anhydride/triethyl phosphate complex was prepared.

Then, raw material polymer solution was dropped in three hours while sulfuric anhydride/triethyl phosphate complex was being stirred in a state in which the raw material polymer solution was cooled with ice. Then, the reaction temperature was raised to 25° C., and then the solution was stirred for 30 minutes. The mixture obtained from the foregoing reactions was diluted with 3000 parts by weight of water. Then, a separation into the aqueous phase and organic phase was performed, and then the aqueous phase was condensed so that solution of Na sulfonate of the waste was obtained. The viscosity of 1 wt % water solution of the obtained Na sulfonate (called treatment material D) at 25° C.

was 153 mPa·S after 0.2 N sodium nitrate was added. After 1.0 N sodium nitrate was added, the viscosity was 95 mPa·S. The introduction ratio of sulfonic groups was 80 mol %.

Preparation Example 5

Manufacturing of Sulfonated Crosslinking Polystyrene and/or Its Salt

Styrene in a quantity of 200 parts by weight, 0.3 part by weight of p-divinylbenzene and 1800 parts by weight of cyclohexane were introduced into a reactor. In a dry nitrogen gas flow, two parts by weight of azobisisobutylonitril was added so as to be stirred at 80° C. for three hours. Then, one part by weight of azobisisobutylonitril was added so as to be stirred at 80° C. for three hours (the foregoing operation was repeated three times). Non-reacted monomer was, together with solvent, removed from the reaction mixture by distillation. The molecular weight of the obtained polymer was measured by GPC, resulting in the molecular weight being 100,000. Then, sulfuric anhydride, which was the sulfonating agent, which was formed into gas, was blown into the raw material solution obtained by adding 1800 parts by weight of cyclohexane to the obtained polymer so that the raw material solution was sulfonated. Solvent was, by distillation, removed from a mixture obtained from the reactions so that sulfonated crosslinking polystyrene was obtained. The obtained sulfonated material was neutralized with ammonia water so that ammonium salt of the sulfonated material was obtained.

The viscosity of 1 wt % water solution of the obtained ammonia salt of the sulfonated material (called treatment material E) at 25° C. was 12 mPa·S (after 1 N sodium nitrate was added). The introduction ratio of sulfonic groups was 75 mol %.

Preparation Example 6

Manufacturing of Sulfonated Plastic Waste and/or Its Salt

A solution obtained by dissolving used VHS video cassette case material (high-impact polystyrene having Mw of 200,000) in a quantity of 70 parts by weight in 630 parts by weight of 1,2-dichloroethane and 93 parts by weight of 60% fuming sulfuric acid were simultaneously dropped in a solution of 700 parts by weight of 1,2-dichloroethane to which 15 parts by weight of triethyl phosphate in 60 minutes. During the dropping operation, the temperature of the reaction system was controlled to satisfy a range from 20° C. to 25° C. After the dropping operation was completed, maturation was performed for 30 minutes. Then, sodium hydroxide solution was added to the reaction system so that the reaction system was neutralized. Then, solvent was removed from the reaction mixture by distillation so that sulfonated plastic waste was obtained.

The viscosity of 1 wt% water solution of the obtained Na sulfonate (called treatment material F) at 25° C. was 20 mPa·S (after 1 N sodium nitrate was added). The introduction ratio of sulfonic groups was 95 mol %.

Preparation Example 7

Manufacturing of Copolymer of Na Styrene Sulfonate

Acrylamide in a quantity of 50 parts by weight, 100 parts by weight of Na styrene sulfonate and 0.1 part by weight of methylene bis (metha) acrylamide were dissolved in 600 parts by weight of refined water. Then, 0.70 part by weight of ammonium persulfate and 0.36 part by weight of potassium hydrogensulfite were added so as to be stirred at 50° C. for three hours.

Moreover, 0.70 part by weight of ammonium persulfate and 0.36 part by weight of potassium hydrogensulfite were added so as to be stirred at 50° C. for three hours.

The viscosity of 1 wt % water solution of the obtained crosslinking copolymer (called treatment material G) of the sulfonated material at 25° C. was 63 mPa·S (after 1 N sodium nitrate was added).

Comparative Preparation Example 1

Manufacturing of Comparative Polymer

Used Styrofoam waste (polystyrene having Mw of 210,000) in a quantity of 100 parts by weight was dissolved in 2000 parts by weight of 1,2-dichloroethane. Then, 2000 parts by weight of concentrated sulfuric acid were added so as to be stirred at 80° C. for three hours. The mixture obtained from the foregoing reactions was diluted with 3000 parts by weight of water, and then neutralized with sodium hydroxide solution. After a condensing process was completed, a re-crystallizing process was performed to remove the sodium sulfate. Thus, solution of Na sulfonate of the waste was obtained.

The viscosity of 1 wt % water solution of the obtained non-crosslinking polymer (called comparative treatment material a) at 25° C. was 4.0 mPa·S (after 1 N sodium nitrate was added). The introduction ratio of sulfonic groups was 90 mol %.

Comparative Preparation Example 2

Manufacturing of Comparative Polymer

Used styrofoam waste (polystyrene having Mw of 210,000) in a quantity of 100 parts by weight was dissolved in 2000 parts by weight of 1,2-dichloroethane so that raw material polymer solution was prepared. While solution obtained by adding 260 parts by weight of triethyl phosphate to 3000 parts by weight of 1,2-dichloroethane was being stirred in a state in which the solution was cooled with ice, 160 parts by weight of sulfuric anhydride were dropped. Thus, sulfuric anhydride/triethyl phosphate complex was prepared.

While the prepared complex was being stirred in a state where the complex was cooled with ice, the raw material polymer solution was dropped in three hours. Then, the reaction temperature was raised to 25° C., and then the solution was stirred for 30 minutes. The mixture obtained from the foregoing reactions was diluted with 3000 parts by weight of water, and then the mixture was neutralized with sodium hydroxide solution. Then, the aqueous phase and the organic phase were separated from each other, and then the aqueous phase was condensed so that Na sulfonate of the waste was obtained.

The viscosity of 1 wt % water solution of the obtained non-crosslinking polymer (called comparative treatment material b) at 25° C. was 6.3 mPa·S (after 1 N sodium nitrate was added). The introduction ratio of sulfonic groups was 100 mol %.

Comparative Preparation Example 3

Manufacturing of Comparative Polymer

Na styrene sulfonate monomer in a quantity of 100 parts by weight was dissolved in 300 parts by weight of refined water. Then, one part by weight of ammonium persulfate and 0.5 part by weight of potassium hydrogensulfite were added. Then, the solution was stirred at 50° C. in three hours. Then, one part by weight of ammonium persulfate and 0.5 part by weight of potassium hydrogensulfite were added so as to be stirred at 50° C. for three hours. Moreover, one part by weight of ammonium persulfate and 0.5 part by weight of potassium hydrogensulfite were added so as to be stirred at 50° C. for three hours.

The viscosity of 1 wt % water solution of the obtained non-crosslinking Na polystyrene sulfonate (called comparative treatment material c) at 25° C. was 5.1 mPa·S (after 1 N sodium nitrate was added).

As other comparative treatment materials, the following samples were prepared.

Comparative Treatment Material D

Commercial Na polystyrene sulfonate having Mw: 500,000 (reagent manufactured by Scientific Polymer)

The viscosity of 1 wt % water solution of comparative treatment material d at 25° C. was 4.2 mPa·S (after 1 N sodium nitrate was added).

Comparative Treatment Material E

Commercial Na polystyrene sulfonate having Mw: 2,600,000 (reagent manufactured by Chemco)

The viscosity of 1 wt % water solution of comparative treatment material e at 25° C. was 9.8 mPa·S after 0.2 N sodium nitrate was added. After 1.0 N sodium nitrate was added, the viscosity was 9.5 mPa·S.

Comparative Treatment Material F

Commercial soda homopolymer of polyacrylic acid

The viscosity of 1 wt % water solution of comparative treatment material f at 25° C. was 70 mPa·S (after 1 N sodium nitrate was added).

In the following examples, the following medicaments were employed.

Combined Medicament A

Anion polymer flocculating agent: partial hydrolysate of polyacrylamide (Medium Anion)

Combined Medicament B cation polymer flocculating agent: quaternary methylchloride of dimethylaminoethylacrylate (strong cation)

Combined Medicament C

Inorganic flocculating agent: aluminum sulfate

The viscosity of the polymer solution and the introduction ratio of the sulfonic groups of each of the foregoing treatment materials were measured as follows:

(1) Viscosity of Polymer Electrolyte

As the rotating viscometer, type-B viscometer manufactured by Tolyo Keiki was employed. As the solution which must be measured, solution was used which was obtained by dissolving each polymer in 0.2 N and 1.0 N sodium nitrate solutions such that the effective component of the polymer was 1 wt %. The temperature of the solution was made to be 25° C. during the measurement. Note that the viscosity was calculated by obtaining conversion coefficient from the employed rotor number and the number of rotations (rpm) and by multiplying reading of the scale with the foregoing coefficient.

(2) Introduction Ratio of Sulfonic Groups

When the raw material polymer was composed of only aromatic monomer units, the introduction ratio of sulfonic groups per one aromatic ring group was calculated (in a case where sulfate was contained in the water-soluble polymer, the quantity of the sulfate was determined by an ion chromatography to subtract the determined quantity from the atomic weight of sulfur atom measured by an elemental analyzer) in accordance with the ratio of carbon atoms and sulfur atoms measured by an elemental analyzer (EA-1108 manufactured by Carloelba).

When the raw material polymer was copolymer of aromatic monomer and another monomer, 1H-NMR spectrum (JNM-EX270 manufactured by Japan Electron Optics Laboratory) was measured. Then, the introduction ratio was obtained by calculating $(b/2)/(a/3+b/2) \times 100$ in accordance with peak intensity (a) adjacent to 7.6 ppm and peak intensity (b) adjacent to 8.1 ppm.

Example 1

Initially, 500 ppm of aluminum sulfate (combined medicament C), which was an inorganic flocculating agent, were added to waste water (pH 8.2 and SS 0.4 wt %) from an electronic part plant so that a primary flocculating process was performed. Then, the suspension in a quantity of 100 ml was introduced into a 200 ml stoppered measuring cylinder, and then each sample (each of the treatment materials shown in Table 1) into the measuring cylinder by using a measuring pippet (a solid component of each polymer in a quantity of 10 ppm was added to the suspension). Immediately after the introduction, the measuring cylinder was stirred by vertically rotating the measuring cylinder 10 times. Then, the measuring cylinder was allowed to stand to measure the settling velocity and the turbidity (one minute after start of allowing the suspension to stand) of supernatant liquid after settling. Then, the treated solution was filtered by polypropylene filter cloth. Then, filtered sludge was held between two propylene clothes so as to be squeezed by a squeezing test machine for one minute. Thus, the water content in the cake and separability with respect to the filter cloth were measured.

The evaluation of the separability was performed such that satisfactory results were indicated with double circles, acceptable results were indicated with circles, somewhat unsatisfactory results were indicated with triangles and unsatisfactory results were indicated with x. Results were shown in Table 1.

TABLE 1

| Treatment material | Primary Flocculating Process | Combined medicament | Settling velocity (m/hr) | Turbidity (ppm) | Separability | Water Content (%) |
|---|---|---|---|---|---|---|
| B | Not Performed | — | 15 | 39 | ○ | 72.8 |
| — | Not Performed | A | 12 | 72 | Δ | 77.4 |
| e | Not Performed | — | 6 | >100 | X | 77.8 |
| A | Performed | — | 25 | 20 | ○ | 72.2 |

TABLE 1-continued

| Treatment material | Primary Flocculating Process | Combined medicament | Settling velocity (m/hr) | Turbidity (ppm) | Separability | Water Content (%) |
|---|---|---|---|---|---|---|
| B | Performed | — | 38 | 8 | ◉ | 71.4 |
| C | Performed | — | 28 | 15 | ○ | 72.0 |
| D | Performed | — | 34 | 10 | ◉ | 71.8 |
| E | Performed | — | 25 | 24 | ○ | 72.5 |
| F | Performed | — | 28 | 20 | ○ | 72.2 |
| G | Performed | — | 30 | 18 | ◉ | 72.0 |
| A (5 ppm) | Performed | A (5 ppm) | 31 | 20 | ○ | 71.8 |
| a | Performed | — | <3 | >100 | X | >78 |
| b | Performed | — | 4 | >100 | X | >78 |
| c | Performed | — | <3 | >100 | X | >78 |
| d | Performed | — | <3 | >100 | X | >78 |
| e | Performed | — | 13 | 65 | Δ | 75.9 |
| f | Performed | — | 19 | 65 | Δ | 75.9 |
| — | Performed | A | 20 | 54 | Δ | 76.8 |

As can be understood from the foregoing results, combination with the inorganic flocculating agent (combined medicament C) improved the flocculating effect. The samples (treatment materials A to G) having the crosslinking structures according to the present invention had excellent settling velocity, turbidity of the supernatant, filtration velocity in the dehydrating process, separability of the dehydrated cakes and water content in the cakes as compared with non-cross linking samples (comparative treatment materials a to e) and the commercial flocculating agents (comparative treatment material f and combined medicament A). Moreover, the flocculating effect was improved by the combination with the commercial flocculating agent [treatment material A+combined medicament A].

Example 2

Evaluation of Flocculation Effect of Sewage

Sludge (pH 7.0, SS 0.8 wt %) obtained from a sewage disposal plant was subjected to a jar test. The sample (combined medicament B) in a quantity of 0.4 wt % per SS was added to sludge which was being stirred by a jar tester so that the same was stirred. Then, each sample shown in Table 2 was added in a quantity of 0.2 wt % per SS, and stirring was performed so that the solution was flocculated. Then, the flocculated solution was subjected to a Nutsche test using propylene filter cloth (PP26FK) so that the filtration velocity was measured. The turbidity of the filtrate was measured by a transmission-type turbidity meter. Filtered sludge was, by a squeezing test machine, squeezed for one minute in a state in which sludge was held between two filter clothes. Then, the water content in the cake and the separability from the filter cloth were measured.

The results of the evaluation of the separability were indicated such that satisfactory results were indicated with double circles, acceptable results were indicated with circles, somewhat unsatisfactory results were indicted with triangles and unsatisfactory results were indicated with x. Results were shown in Table 2.

TABLE 2

| Treatment material | Combined Treatment material | Settling velocity (m/hr) | Turbidity (ppm) | Filtration Velocity (ml/min) | Separability | Water Content (%) |
|---|---|---|---|---|---|---|
| A | — | 25 | 20 | 102 | ◉ | 71.7 |
| B | — | 34 | 7 | 280 | ◉ | 70.4 |
| C | — | 28 | 20 | 147 | ◉ | 71.5 |
| D | — | 31 | 12 | 225 | ◉ | 70.9 |
| E | — | 21 | 23 | 82 | ◉ | 71.9 |
| F | — | 23 | 19 | 102 | ◉ | 71.6 |
| G | — | 27 | 15 | 178 | ◉ | 71.3 |
| A (0.1 wt %) | f (0.1 wt %) | 28 | 15 | 95 | ◉ | 72.0 |
| a | — | <1 | >100 | <20 | X | >78 |
| b | — | 8 | >100 | 11 | X | >78 |
| c | — | <1 | >100 | <20 | X | >78 |
| d | — | <1 | >100 | <20 | X | >78 |
| e | — | 11 | 89 | 32 | X | 77.0 |
| f | — | 13 | 95 | 18 | X | 77.5 |

As can be understood from the foregoing results, the samples (treatment materials A to G) having the crosslinking structures according to the present invention had excellent settling velocity, turbidity of the supernatant, the filtration velocity during the dehydrating process, the separability of the dehydrated cakes and water content in the cakes as compared with the non-crosslinking samples (comparative treatment materials a to e) and commercial anion flocculating agent (comparative treatment material f). Also the combination with the commercial flocculating agent [treatment material A+comparative treatment material f] had improved the flocculating effect.

Example of Application to Treatment of Sludge

The sulfonated styrene polymer and/or its salt having a molecular weight of 1,100,000 (polymers 1 to 9) according to this embodiment and comparative polymers 1 to 5 for use in comparisons, the cation polymer flocculating agents and inorganic flocculating agent will now be described.

Polymer 1

Polymer 1 is Na polystyrene sulfonate having an weight average molecular weight of 1,500,000 and the introduction ratio of sulfonic groups with respect to styrene units is 100 mol %.

The Na polystyrene sulfonate was prepared as follows.

Initially, commercial GP-grade polystyrene (weight average molecular weight Mw: 200,000) in a quantity of 100 parts by weight were dissolved in 2000 parts by weight of chloroform so that raw material solution was prepared. The raw material solution was, together with sulfuric anhydride ($SO_3$) which was a sulfonating material, continuously supplied to a sulfonating reactor having a turbine stirrer so that sulfonating reactions were performed at 45° C. The solution was supplied as follows: the raw material solution was supplied at 80 g/minute and sulfuric anhydride was supplied at 3.38 g/minute. The molar ratio ($SO_3$/styrene unit) of $SO_3$ with respect to styrene units of polystyrene was 1.10. The reactor having a jacket and a capacity of 400 ml was employed. Then, chloroform was, by distillation, removed from the mixture obtained from the foregoing reactions so that sulfonated polystyrene was obtained. The obtained sulfonated polystyrene was neutralized with sodium hydroxide solution so that Na polystyrene sulfonate was obtained. The Na polystyrene sulfonate had the weight average molecular weight of 1,500,000 and the introduction ratio of sulfonic groups with respect to the styrene unit was 100 mol %.

Polymer 2

Polymer 2 is Na polystyrene sulfonate having a weight average molecular weight of 1,600,000 and an introduction ratio of sulfonic groups with respect to the styrene unit of 100 mol %.

The Na polystyrene sulfonate was prepared from raw material which was styrofoam waste by the following procedure.

Initially, used styrofoam waste (polystyrene having weight average molecular weight Mw: 210,000) in a quantity of 60 parts by weight was dissolved in 2000 parts by weight of 1,2-dichloroethane. Thus, raw material solution was prepared. The raw material solution was, together with sulfuric anhydride ($SO_3$) which was a sulfonating material, continuously supplied to a sulfonating reactor having a turbine stirrer so that sulfonating reactions were performed at 45° C. In the foregoing case, supply rates were as follows: the raw material solution was supplied at 80 g/minute and sulfuric anhydride was supplied at 2.12 g/minute. The molar ratio ($SO_3$/styrene unit) of $SO_3$ with respect to the styrene unit in the polystyrene was 1.15. The reactor having a jacket and a capacity of 400 ml was employed.

Then, 1,2-dichloroethane was, by distillation, removed from the mixture obtained from the foregoing reactions so that polystyrene sulfonate was obtained. The neutralization process was performed by using sodium hydroxide solution so that Na polystyrene sulfonate was prepared. The Na polystyrene sulfonate had a weight average molecular weight of 1,600,000 and the introduction ratio of sulfonic groups was 100 mol %.

Polymer 3

Polymer 3 is Na polystyrene sulfonate having an weight average molecular weight of 3,000,000 and the introduction ratio of sulfonic groups with respect to styrene units is 90 mol %.

The Na polystyrene sulfonate was prepared by a method similar to that for preparing polymer 2 except for employment of housing waste of television sets (mainly composed of polystyrene having a weight average molecular weight Mw: 180,000 and containing polybutadiene by 5 mol %) in place of Styrofoam. The similar process included preparation of the raw material solution, the sulfonating process, distillation for removing the solvent and neutralization using sodium hydroxide.

Polymer 4

Polymer 4 is K styrene-isoprene copolymer sulfonate having an weight average molecular weight of 1,100,000 and the introduction ratio of sulfonic groups with respect to styrene units is 60 mol %.

The K styrene-isoprene copolymer sulfonate was prepared as follows.

Initially, a mixture of 140 parts by weight of styrene, 60 parts by weight of isoprene, 5 parts by weight of 1,4-dioxane and 3800 parts by weight of cyclohexane was introduced into an autoclave reactor so that nitrogen was substituted for the inside portion of the reactor. Then, 0.7 ml of hexane solution, in which n-butyllithium was dissolved by 1.6 mol/l, was added to the foregoing mixture so that polymerization was performed for 5 hours. The molecular weight of the obtained polymer was measured by GPC. The molecular weight was 180,000.

The obtained polymer solution was introduced into a glass reactor, and then sulfuric anhydride, which was a sulfonating agent in the form of gas, was blown into the glass reactor so that the sulfonating process was performed. Then, solvent was removed from the obtained mixture by distillation so that sulfonated styrene-isoprene copolymer was obtained. Then, a neutralizing process was performed by using potassium hydroxide solution so that K styrene-isoprene copolymer sulfonate was prepared. The K styrene-isoprene copolymer sulfonate had an weight average molecular weight of 1,100,000 and the introduction ratio of sulfonic groups with respect to the styrene unit was 60 mol %.

Polymer 5

Polymer 5 is Na styrene-acrylic acid copolymer sulfonate having an weight average molecular weight of 1,130,000 and an introduction ratio of sulfonic groups with respect to styrene units is 95 mol %.

The Na styrene-acrylic acid copolymer sulfonate was prepared as follows:

Initially, a mixture of 160 parts by weight of styrene, 40 parts by weight of acrylic acid and 1800 parts by weight of 1,2-dichloroethane was introduced into a reactor. In a dry nitrogen gas flow, 0.4 part by weight of benzoyl peroxide was added, and then stirring was performed at 80° C. for three hours. Then, 0.4 part by weight of benzoyl peroxide was added, and then stirring was performed at 80° C. for three hours. Then, addition and stirring of benzoyl peroxide was repeated three times so that polymerization was performed. Then, non-reacted monomer was, together with solvent, removed from the mixture by distillation so that styrene-acrylic acid copolymer was obtained. The molecular weight of the obtained polymer was measured by GPC. The molecular weight was 250,000.

The obtained polymer was dissolved in 1800 parts by weight of 1,2-dichloroethane, and then subjected to sulfonating, removal of the solvent by distillation and neutralization using the sodium hydroxide. Thus, the Na styrene-acrylic acid copolymer sulfonate was prepared. The obtained Na styrene-acrylic acid copolymer sulfonate had an weight average molecular weight of 1,130,000 and the introduction ratio of sulfonic groups with respect to styrene units was 95 mol %.

Polymer 6

Polymer 6 is crosslinking ammonia polystyrene sulfonate having a weight average molecular weight of 1,500,000 and an introduction ratio of sulfonic groups with respect to styrene units is 75 mol %.

The crosslinking ammonia polystyrene sulfonate was prepared as follows.

Initially, a mixture of 200 parts by weight of styrene, 1 part by weight of p-divinylbenzene and 1800 parts by weight of cyclohexane were introduced into a reactor. In a dry nitrogen gas flow, one part by weight of azobisisobutylonitril was added so as to be stirred at 80° C. for three hours. Then, one part by weight of azobisisobutylonitril was added so as to be stirred at 80° C. for three hours. Then, addition and stirring of azobisisobutylonitril were repeated three times so that a polymerizing reaction was performed. Removal of non-reacted monomer from the mixture obtained from the reactions was performed by distillation so that crosslinking polystyrene was obtained. The molecular weight of the obtained polymer was measured by GPC. The molecular weight was 200,000.

Then, 1800 parts by weight of cyclohexane were added to the obtained polymer, and sulfuric anhydride, which was the sulfonating agent in the form of gas, was blown into the solution so that a sulfonating process was performed. Then, removal of the solvent from the mixture obtained from the foregoing reactions by performing distillation. Thus, crosslinking polystyrene sulfonate was obtained. Then, neutralization using ammonia water was performed so that crosslinking ammonia polystyrene sulfonate was prepared. The crosslinking ammonia polystyrene sulfonate had an weight average molecular weight of 1,500,000 and the introduction ratio of sulfonic groups with respect to styrene units was 75 mol %.

Polymer 7

Polymer 7 is a copolymer of Na styrene sulfonate and Na acrylamide-methylpropane sulfonate having a weight average molecular weight of 1,300,000.

The copolymer was prepared as follows.

Initially, 100 parts by weight of Na styrene sulfonate and 80 parts by weight of Na 2-acrylamide-2-methylpropane sulfonate (AMPS) were dissolved in 720 parts by weight of refined water. Then, 0.45 part by weight of ammonium persulfate and 0.23 parts by weight of potassium hydrogensulfite were added, and then stirring was performed at 50° C. for three hours. Then, 0.45 part by weight of ammonium persulfate and 0.23 parts by weight of potassium hydrogensulfite were added, and then stirring was performed at 50° C. for three hours. Thus, copolymer of AMPS and Na styrene sulfonate was obtained. The obtained copolymer had a weight average molecular weight of 1,300,000.

Polymer 8

Polymer 8 is copolymer of Na styrene sulfonate and acrylamide having a weight average molecular weight of 2,300,000.

The foregoing copolymer was prepared as follows.

Initially, 50 parts by weight of acrylamide, 100 parts by weight of Na styrene sulfonate monomer and one part by weight of methylene bismethaacrylamide were dissolved in 600 parts by weight of refined water. Then, 0.35 part by weight of ammonium persulfate and 0.18 parts by weight of potassium hydrogensulfite were added, and then stirring was performed at 50° C. for three hours. Then, 0.35 part by weight of ammonium persulfate and 0.18 parts by weight of potassium hydrogensulfite were added, and then stirring was performed at 50° C. for three hours. Thus, copolymer of Na styrene sulfonate and acrylamide was prepared. The weight average molecular weight of the obtained copolymer was 2,300,000.

Polymer 9

Polymer 9 is polystyrene sulfonic acid having a weight average molecular weight of 1,500,000 and the introduction ratio of sulfonic groups with respect to styrene units is 100 mol %.

The polystyrene sulfonic acid was prepared by a process similar to that for preparing polymer 1 except for omission of the neutralization using the sodium hydroxide.

Comparative Polymer 1

Comparative polymer 1 is Na polystyrene sulfonate having a weight average molecular weight of 500,000 and an introduction ratio of sulfonic groups with respect to styrene units is 90 mol %.

The Na polystyrene sulfonate was prepared from raw material which was styrofoam waste as follows.

Initially, 100 parts by weight of styrofoam waste (polystyrene having an weight average molecular weight Mw of 210,000) was dissolved in 2000 parts by weight of 1,2-dichloroethane. Then, 2000 parts by weight of concentrated sulfuric acid were added, and then stirring was performed at 80° C. for three hours. Then, a mixture obtained from the reactions was diluted with 3000 parts by weight of water, and then neutralized with sodium hydroxide. Then, the mixture obtained from the reactions was condensed and a re-crystallizing process was performed to remove the sodium sulfate. Thus, Na polystyrene sulfonate was obtained. The weight average molecular weight of the obtained Na polystyrene sulfonate was 500,000 and the introduction ratio of sulfonic groups with respect to styrene units is 90 mol %.

Comparative Polymer 2

Comparative polymer 2 is Na polystyrene sulfonate having an weight average molecular weight of 700,000 and the introduction ratio of sulfonic groups with respect to styrene units is 100 mol %.

The Na polystyrene sulfonate was prepared from raw material which was styrofoam.

Initially, 100 parts by weight of styrofoam waste (polystyrene having a weight average molecular weight Mw of 210,000) were dissolved in 2000 parts by weight of 1,2-dichloroethane so that raw material solution was prepared. On the other hand, 240 parts by weight of sulfuric anhydride were dropped in solution in which 273 parts by weight of triethyl phosphate were added to 3000 parts by weight of 1,2-dichloroethane such that stirring was performed in a state in which the solution was cooled with ice. Thus, anhydride/triethyl phosphate complex was prepared. Then, raw material solution was dropped in the solution of the anhydride/triethyl phosphate complex solution in three hours such that stirring was performed in a state in which the solution was cooled with ice. Then, the reaction temperature was raised to 25° C., and then stirring was performed for 30 minutes so that a sulfonating process was performed. Then, a mixture obtained from the reactions was diluted with 3000 parts by weight of water, and then neutralized with sodium hydroxide solution. Since the solution was separated into an aqueous phase and an organic phase, the aqueous phase was condensed so that the Na polystyrene sulfonate was prepared. The Na polystyrene sulfonate had an weight average molecular weight of 700,000 and an introduction ratio of sulfonic groups was 100 mol %.

Comparative Polymer 3

Comparative polymer 3 is Na polystyrene sulfonate having an weight average molecular weight of 500,000.

The Na polystyrene sulfonate was prepared as follows.

Initially, 100 parts by weight of Na polystyrene sulfonate monomer was dissolved in 300 parts by weight of refined water. Then, one part of ammonium persulfate and 0.5 part by weight of potassium hydrogensulfite were added, and then stirring was performed at 50° C. for three hours. Then, one part of ammonium persulfate and 0.5 part by weight of potassium hydrogensulfite were added, and then stirring was performed at 50° C. for three hours. Thus, the Na polystyrene sulfonate was obtained. The Na polystyrene sulfonate had an weight average molecular weight of 500,000.

Comparative Polymer 4

Comparative polymer 4 is Na polystyrene sulfonate (manufactured by Chemco) having a weight average molecular weight Mw of 1,000,000.

Comparative Polymer 5

Comparative Polymer 5 is commercial polyacrylic acid soda [viscosity of 0.2% water solution (20° C.): 680 cps]

Cation Polymer Flocculating Agent

The cation polymer flocculating agent was quaternary methylchloride of polydimethyl aminoethyl acrylate (strong cation type).

Inorganic Flocculating Agent

The inorganic flocculating agent was aluminum sulfate.

The weight average molecular weight of the styrene polymer which was the raw material, and the weight average molecular weight and the amount of the sulfonic groups of each of polymers 1 to 8 and comparative polymers 1 to 3 were measured as follows.

<Weight Average Molecular Weight of Styrene Polymer>

The weight average molecular weight was measured by using an ultraviolet-ray detector (measuring wavelength of 266 nm) by the GPC (Gel Penetration Chromatography) method. As a standard reference material, standard reference polystyrene was employed. The columns were TSK-G4000HXL and G2500HXL which were trade names of Toso.

<Polymers 1 to 9 (Weight Average Molecular Weight of Sulfonated Styrene Polymer>and/or Its Salt)

The weight average molecular weight was measured by a static light scattering method written in 60 (12) 487 to 495 (1986) "Chemistry and Industry".

Specifically, RM-102 which was trade name of Otsuka Electronics was used to obtain the refractivity at the concentration of each sample by using 0.1 M/l potassium chloride. Thus, the differential refractivity was calculated.

Moreover, DLS-600 which was trade name of Otsuka Electronics was used to measure scattering intensity in a range of θ from 30° to 150° at the concentration of each sample by using 0.1 M/l potassium chloride.

The obtained characteristic values were analyzed by Zimm plotting so that the molecular weight was calculated.

<Introduction Ratio of Sulfonic Groups (Sulfonated Styrene Polymer and/or Its Salt) of Polymers 1 to 9>

When the raw material polymer was composed of only aromatic monomer units, the introduction ratio of sulfonic groups per one aromatic ring group was calculated in accordance with the ratio of carbon atoms and sulfur atoms measured by an elemental analyzer (EA-1108 manufactured by Carloelba). When water-soluble polymer contained sulfate, the quantity of sulfur atoms of the sulfate was subtracted from the quantity of sulfur atoms obtained by the element analyzer.

When the raw material polymer was copolymer of aromatic monomer and another monomer, 1H-NMR spectrum was measured by an NMR analyzer (JNM-EX270 manufactured by Japan Electron Optics Laboratory). Then, peak intensity (a) adjacent to 7.6 ppm and peak intensity (b) adjacent to 8.1 ppm were used to obtain the ratio in accordance with an equation $(b/2)/(a/3+b/2) \times 100$ for obtaining the introduction ratio.

Evaluation of Effect to Flocculate Sludge

The flocculation performance of each of polymers 1 to 8 was evaluated as follows.

Sludge (pH 7.0, SS 0.8 wt %) obtained from a sewage disposal plant was subjected to a jar test.

Initially, cation polymer flocculating agent was added to suspended substances of each sludge which was being stirred by a container (a jar tester) having a stirrer in a quantity of 0.4 wt % of the quantity of the suspended substances. Thus, stirring was performed. Then, each of polymers 1 to 8 and comparative polymers 1 to 5 was added in a quantity of 0.2 wt % with respect to the quantity of the suspended substances. Then, stirring was performed so that the suspended substances were flocculated. Note that two samples of sludge were treated such that the cation polymer flocculating agent was added by 0.4 wt % or 0.6 wt % with respect to the quantity of the suspended substances. Then, further addition was not performed after the foregoing addition.

Then, flocculated solution was subjected to a Nutsche test using propylene filter cloth (PP26FK) so that the filtration velocity was measured. The turbidity of the filtrate was measured by a transmission-type turbidity meter. Then, sludge which was residue from the filtering process was held between two filter cloths. In this state, squeezing was performed for one minute by a squeezing tester. The water content of cakes of sludge and separability with respect to the filter cloth were examined.

The thus-measured filtration velocity, the turbidity of the filtrate, separability of the cakes and the water content in the cakes were shown in Table 3. The results of the evaluation of the separability shown in Tabile 3 were indicated such that excellent separability was indicated with double circles, satisfactory separability was indicated with circles and unsatisfactory separability was indicated with ×.

TABLE 3

| Treatment material | Filtration Velocity (ml/min) | Turbidity of Filtrate (ppm) | Separability | Water Content in Cakes (%) |
|---|---|---|---|---|
| Cation Polymer Flocculating Agent, Polymer 1 | 123 | 17 | ⊚ | 89.1 |

TABLE 3-continued

| Treatment material | Filtration Velocity (ml/min) | Turbidity of Filtrate (ppm) | Separability | Water Content in Cakes (%) |
|---|---|---|---|---|
| Cation Polymer Flocculating Agent, Polymer 2 | 135 | 15 | ⊙ | 88.7 |
| Cation Polymer Flocculating Agent, Polymer 3 | 152 | 13 | ⊙ | 88.5 |
| Cation Polymer Flocculating Agent, Polymer 4 | 115 | 30 | ○ | 89.5 |
| Cation Polymer Flocculating Agent, Polymer 5 | 125 | 25 | ○ | 89.4 |
| Cation Polymer Flocculating Agent, Polymer 6 | 131 | 20 | ⊙ | 88.9 |
| Cation Polymer Flocculating Agent, Polymer 7 | 130 | 22 | ⊙ | 89.0 |
| Cation Polymer Flocculating Agent, Polymer 8 | 140 | 18 | ⊙ | 88.7 |
| Cation Polymer Flocculating Agent, Comparative Polymer 1 | 35 | 48 | X | 94.2 |
| Cation Polymer Flocculating Agent, Comparative Polymer 2 | 45 | 40 | X | 93.5 |
| Cation Polymer Flocculating Agent, Comparative Polymer 3 | 31 | 50 | X | 94.5 |
| Cation Polymer Flocculating Agent, Comparative Polymer 4 | 47 | 45 | X | 93.9 |
| Cation Polymer Flocculating Agent, Comparative Polymer 5 | 34 | 45 | X | 94.9 |
| Only Cation Polymer Flocculating Agent (0.4 wt %) | 20 | 47 | X | 95.6 |
| Only Cation Polymer Flocculating Agent (0.6 wt %) | 28 | 79 | X | 95.3 |

As shown in Table 3, when the cation polymer flocculating agent and any one of polymers 1 to 8 which were salt of the sulfonated styrene polymer having a molecular weight of 1,100,000 were combined with each other, the filtration velocity was high, the turbidity of the filtrate was low and excellent separability of the cakes was realized. Moreover, the water content in the cakes was low. In the case of even the salt of the sulfonated styrene polymer which had the molecular weight smaller than 1,100,000 (comparative polymers 1 to 4) and the other type polymer (comparative polymer 5) or in the case of only the cation polymer flocculating agent, the filtration velocity was low and the turbidity of the filtrate was high. Moreover, the separability of the cakes is unsatisfactory and the water content of the cakes was high.

Thus, it is preferable that the sulfonated styrene polymer and/or its salt was employed as the polymer which was combined with the cation polymer flocculating agent. Moreover, the sulfonated styrene polymer and/or its salt must have the weight average molecular weight of 1,100,000 or greater.

Evaluation of Effect of Flocculating Waste Water From Paper Mill

Waste water (pH: 7.5, concentration of suspended substances: 120 ppm) from a paper mill was prepared so as to be divided into a plurality of containers.

Then, the inorganic flocculating agent was added to each of waste water samples in a quantity of 400 ppm. Then, 2 ppm of each of polymers 1, 3 and 9 and comparative polymer 4 and 5 was added, and the solution was allowed to stand. At this time, the settling velocity of suspended substances was measured.

Then, each flocculated solution was filtered by polypropylene cloth (trade name: PP26FK) so as to measure the turbidity of the filtrate and COD (Chemical Oxygen Demand).

Then, sludge which was the residue in the filtering process was held between two filter cloths. In this state, squeezing was performed for one minute by operating a squeezing test machine so that the water content of the cakes of the obtained sludge was examined.

The thus-measured settling velocity, the turbidity of supernatant liquid, COD and the water content of the cakes were shown in Table 4.

TABLE 4

| Treatment material | Settling Velocity (ml/min) | Turbidity of Filtrate (ppm) | COD (ppm) | Water Content in Cakes (%) |
|---|---|---|---|---|
| Inorganic Flocculating Agent, Polymer 1 | 37 | 22 | 44 | 91.2 |
| Inorganic Flocculating Agent, Polymer 3 | 45 | 15 | 48 | 90.9 |
| Inorganic Flocculating Agent, Polymer 9 | 32 | 25 | 52 | 92.2 |
| Inorganic Flocculating Agent, Comparative Polymer 4 | 20 | 65 | 125 | 94.9 |
| Inorganic Flocculating Agent, Comparative Polymer 5 | 15 | 69 | 138 | 95.2 |

As shown in Table 4, when the inorganic flocculating agent and polymer 1, 3 or 9 which was the sulfonated styrene polymer and/or its salt having the molecular weight of 1,100,000 or greater were combined with each other, the settling velocity was high, the turbidity of the filtrate and COD were low and the water content in the cakes was low. Even in a case of the salt of the sulfonated styrene polymer which had the molecular weight smaller than 1,100,000 (comparative polymer 4) and in a case of the other type polymer (comparative polymer 5), the settling velocity is low, the turbidity of the filtrate and COD were high and the water content in the cakes is high.

Therefore, it is preferable that the sulfonated styrene polymer and/or its salt is employed as the polymer which is combined with the inorganic flocculating agent. Moreover, the sulfonated styrene polymer and/or its salt must have the weight average molecular weight of 1,100,000 or greater.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A waste water treatment method comprising the following steps:

(a) adding a waste water treatment material to waste water, the material being selected from the group consisting of a sulfonated styrene polymer and a salt of a sulfonated styrene polymer; wherein a 1% aqueous solution of the material has a viscosity ranging from 10 mPa•S to 20,000 mPa•S at 25 degrees C. after a neutral salt has been added to the aqueous solution so that a concentration of the neutral salt in the aqueous solution ranges from 0.01 N to 5 N;

(b) purifying the waste water; and (c) wherein the sulfonated styrene polymer and/or its salt is water soluble and has a multidimensional cross-linked structure.

2. The method of claim 1, wherein the material further comprises a flocculating agent selected from the group consisting of a nonionic polymer flocculating agent, an anionic polymer flocculating agent, a cationic polymer flocculating agent, and an inorganic flocculating agent.

3. The method of claim 1, wherein the sulfonated styrene polymer consists of at least one of a pigment, dye, flame retardant, plasticizer, arid filler.

4. A method of dehydrating sludge comprising the following steps:

(a) adding to the sludge a material selected from the group consisting of a sulfonated styrene polymer and a salt of a sulfonated styrene polymer; and (b) adding a flocculating agent to the sludge and material, the flocculating agent being selected from the group consisting of a cationic polymer flocculating agent and an inorganic flocculating agent.

5. The method of claim 4, wherein the sulfonated styrene polymer and/or its salt is water soluble and has a cross-linked structure.

6. The method of claim 4, wherein the sulfonated styrene polymer and/or its salt is sulfonated waste material.

* * * * *